United States Patent [19]

Kanada

[11] Patent Number: 4,790,769

[45] Date of Patent: Dec. 13, 1988

[54] TELEPHONE MODULAR JACK

[75] Inventor: Hiroshi Kanada, Hisai, Japan

[73] Assignee: Matsushita Electric Works, Ltd., Osaka, Japan

[21] Appl. No.: 164,295

[22] Filed: Mar. 4, 1988

[30] Foreign Application Priority Data

Apr. 15, 1987 [JP] Japan .................................. 62-92450

[51] Int. Cl.$^4$ ............................................ H01R 4/50
[52] U.S. Cl. .................................... 439/344; 439/736; 439/536; 439/676; 439/441
[58] Field of Search ................ 439/344, 676, 536, 538, 439/539, 686, 689, 691, 695, 701, 708, 709, 712, 713, 736, 723, 724, 535, 441

[56] References Cited

U.S. PATENT DOCUMENTS

| | | | |
|---|---|---|---|
| 3,895,266 | 7/1975 | Geiger | 439/723 |
| 4,224,485 | 9/1980 | Krumreich | 439/676 |
| 4,256,358 | 3/1981 | Genz | 439/274 |
| 4,261,633 | 4/1981 | Abernethy | 439/405 |
| 4,406,509 | 9/1983 | Jagen | 439/344 |
| 4,460,233 | 7/1984 | Newton | 439/535 |
| 4,545,635 | 10/1985 | Bunnell | 439/404 |
| 4,725,249 | 2/1988 | Blackwood et al. | 439/535 |

Primary Examiner—David Pirlot
Attorney, Agent, or Firm—Armstrong, Nikaido, Marmelstein & Kubovcik

[57] ABSTRACT

A telephone modular jack includes a base for receiving thereon a contact block carrying an array of spring contacts, the corresponding number of terminal units, and a cover, all mounted downwardly upon the base to be capable of being assembled by an automated technique. Each of the terminal units has a lug which is press-fitted to each one of lead tabs extended from the spring contacts when the contact block is mounted on the base. Each spring contact has a first end portion, a middle portion, and a second end portion, the portions being bent with respect to the others. The contact block includes a upright support and a horizontal support in parallel with the base. The middle portion of each spring contact is molded in the upright support in such a manner as to project the first end portion from the top of the upright support diagonally downward to the base, while the second end portion extends through the horizontal support and projects therefrom to define the lead tab at its end. With the provision of the uniquely configured spring contacts and the contact block, the contact block can be mounted on the base so as to effect the press-fit engagement between the spring contacts and the terminal units while positioning the spring contacts to have their leading edges oriented upwardly, thereby making it possible to assemble the cover on the base in the same direction as the contact block and the terminal units.

10 Claims, 13 Drawing Sheets

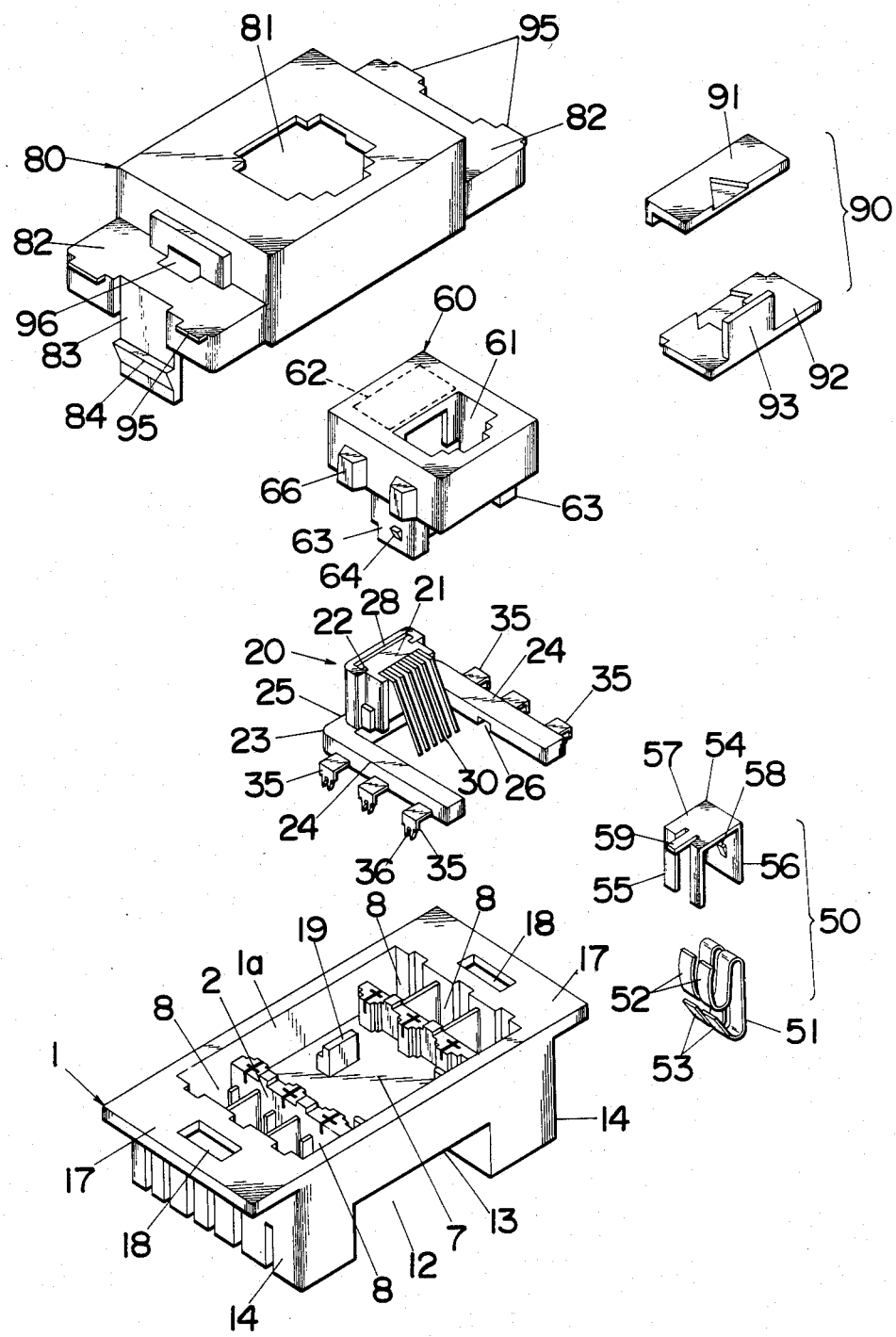

Fig. 8
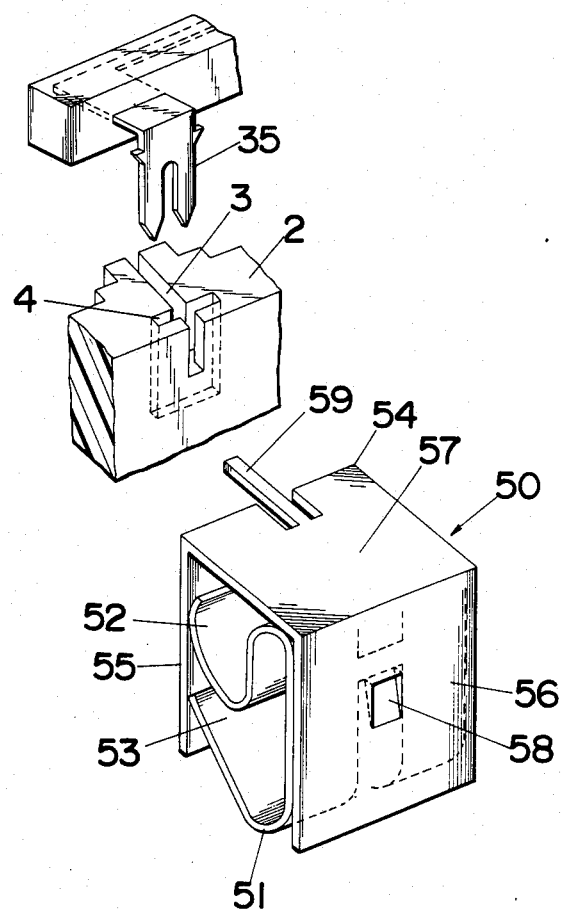
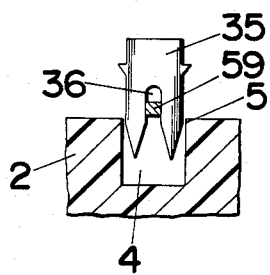
Fig. 9
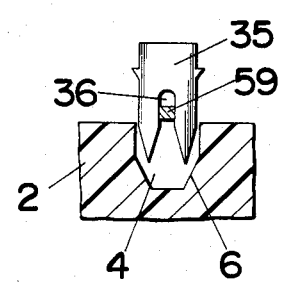
Fig. 10
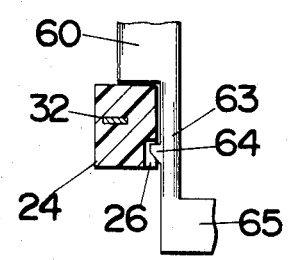
Fig. 11

TELEPHONE MODULAR JACK

BACKGROUND OF THE INVENTION

1. Field of the Invention

The present invention is directed to a telephone modular jack for connection with a standard modular plug, and more particularly to such a modular jack incorporating terminal units for telephone wires in which the terminal units are directly interconnected to cantilever spring contacts and which is adapted for production assembly by automated techniques.

2. Description of the Prior Art

As disclosed in U.S. Pat. No. 4,261,633, there has been proposed a telephone modular jack in which cantilever spring contacts held on a mold base are directly connected to corresponding terminal units mounted on the mold base. The direct connection between the terminal units and the spring contacts are established upon the mounting of the terminal units to the base at which the portion of each cantilever spring contact is forced into a slot formed in each of the terminal units for pressed engagement therewith. The patent also discloses to utilize the cantilever spring contacts which are stamped and formed from a metal strip and further partially molded in the base for facilitating the assembly of the jack. Despite these advantages of the direct electrical connection and the molding in of the cantilever spring contacts, it is rather difficult to fully assemble the jack including a cover having a plug reception window by an automated procedure because of that the terminal units and the cover have to be assembled on the base from different directions. In fact, the prior modular jack is not intended to have the cover assembled in a production line but to have the cover subsequently assembled to the base at a particular site. To date, there is a constant need for fabricating telephone modular jacks in large quantities by utilizing automatic techniques, taking advantage of the molding in of the cantilever spring contacts and taking advantage of the direct electrical connection between the contacts and the terminal units mounted to the base. But unfortunately, no telephone jacks with the above features are found to be successfully assembled by automated procedures.

SUMMARY OF THE INVENTION

In view of the above inconvenience, the present invention is accomplished to satisfy the above need by employing a unique and novel jack structure enabling the assembly by automated procedures. According to the present invention, a telephone modular jack comprises a base having a top-opened contact compartment and a plurality of top-opened terminal compartments, and a cover placed over the base to form therebetween a plug cavity for receiving a mating modular plug with an array of contacts. Mounted into the contact compartment is a contact block carrying an array of cantilever spring contacts for electrical contact with the contacts of the plug. Also mounted into the terminal compartment are individual terminal units each for wiring with a telephone wire. Each terminal unit has a lug for direct electrical connection with each of the cantilever spring contacts to provide electrical continuity from the telephone wires to the corresponding spring contacts through the terminal units. The lug of each terminal unit is fitted in a groove formed in the top surface of a partition separating the terminal compartments from the contact compartment. Each of the cantilever spring contacts has along its length a first end portion, a middle portion, and a second end portion opposite of said first end portion, the portions being bent from the adjacent ones. The contact block includes an upright support in which the middle portions of the spring contacts are imbedded in such a manner that the first end portions of the spring contacts project from the top end of the upright support diagonally down to the bottom of the contact compartment. Also formed in the contact block is a horizontal support in which the second end portions of the spring contacts are imbedded and from which a lead tab integral with each of the second end portions projects for connection with the lug of the corresponding terminal unit. Each of the lead tabs is formed with a slit and is inserted into a notch which is formed in the partition so as to cross with the corresponding groove receiving therein the terminal lug. Whereby, upon assembling the contact block into the contact compartment with the lead tabs inserted into the notches, the terminal lugs are forced to plunge into the slits of the lead tabs for establishing pressed engagement between the lead tabs and the corresponding terminal lugs. By utilizing the uniquely configured contact block carrying the cantilevers springs having the first end, middle, and second portions with the lead tabs, the telephone modular jack of the present invention is capable of assembling the contact block, the terminal units, and the cover to the base all in one direction, rendering the jack structure most suitable for assembly by automated procedures, while assuring the direct electrical connection between the spring contacts and the corresponding terminal units by press-fitting the lead tabs of the spring contacts to the lugs of the terminal units.

Accordingly, it is a primary object of the present invention to provide a telephone modular jack capable of being assembled by automated procedures, yet assuring the direct electrical connection between the cantilever spring contacts and the corresponding terminal units mounted in the jack base.

In addition to the spring contacts being well insulated from each other within the molding of the horizontal support, they can be properly reinforced at the portions adjacent to the lead tabs also by the horizontal support, thereby providing an added structural integrity well resisting the stress developed at the time of press-fitting the lead tabs to the terminal lugs. With this result, it is possible to obtain reliable and secure press-fitting connection between the spring contacts and the terminal units.

It is therefore another object of the present invention to provide a telephone modular jack in which the cantilever spring contacts can be reinforced at the portions adjacent to the leads tabs, permitting the spring contacts to be press-fitted to the corresponding terminal units at a sufficient force to provide reliable and secure direct interconnection between the spring contacts and the terminal units.

In a preferred embodiment of the present invention, the terminal units are arranged on the opposite sides of the spring contacts. In conformity with this arrangement, the horizontal yoke is U-shaped to have the plural lead tabs on each of the yokes of U-shape so that the lead tabs can be positioned adjacent to the corresponding terminal units. The U-shaped support can serve as an effective and well balanced anvil or downward force receiving member effective for press-fitting the lead tabs to the terminal units.

It is therefore a further object of the present invention to provide a telephone modular jack of the type having the terminal units arranged on the opposite sides of the spring contacts in which the lead tabs can be effectively press-fitted to the corresponding terminal units by better utilization of the U-shaped horizontal support carrying the lead tabs.

In the present invention there is disclosed an advantageous structure for preassembling the contact block having the above features. The U-shaped horizontal support has on its center segment an integral upright wall which is separated from the upright support molded over the middle portions of the spring contacts but connected thereto through the segments of the spring contacts. Formed in the upright wall is a catch recess into which the upright support is securely received with the spring contacts bent at the segments connecting the upright wall and the upright support. With this configuration, the upright support carrying the diagonally projecting spring contact portions can be fixed in a stable position for ensuring reliable contact engagement of such diagonally projection contact portions with the corresponding contact members of the mating plug, while retaining the advantage of utilizing the spring contacts obtained by being stamped and molded in the upright support.

It is therefore a further object of the present invention to provide a telephone jack in which the contact block can be preassembled effectively and advantageously to give reliable connection with the mating plug.

Also included in the telephone jack of the present invention is an inner frame placed between the base and the cover to define therebetween the plug cavity. The inner frame is formed at its lower ed with an integral comb which holds . the free ends of the cantilever spring contacts in such a manner as to electrically separate them from one another. The inner frame is assembled onto the contact black with its bottom seated on the U-shaped horizontal support and secured thereto with latch projections on the side walls thereof engaged with undercuts in the parallel yokes of the horizontal support by utilizing the resiliency of the yokes. Thus, the inner frame defining the plug cavity can be secured to the base simply by placing the inner frame on the contact block but with an exact positioning relation with the cantilever springs on the contact block, ensuring exact registration between the spring contacts and the contacts member on the mating plug in addition to keeping the spring contacts in predetermined spaced relation by the comb.

It is therefore a further object of the present invention to provide a telephone modular jack in which the plug cavity defining member can be easily assembled but exactly positioned to provide reliable electrical connection with the mating plug.

The cover is formed on its underside with depending ribs which abuts on poke projections on the opposite sides of the inner frame. Thus, when the cover is assembled on the base, the inner frame receives from the cover a downward force which in turn presses the horizontal support in unity with the contact block upon the base, contributing to stably holding the contact block in position as well as to giving enough force to make the press-fit engagement between the lead tabs and the terminal lugs of the corresponding terminal units. With this structural feature, the press-fitting can be done simply by assembling the cover to the base and without requiring any additional separate step of press-fitting the spring contacts to the terminal units, which is most advantageous for automated assembly of the telephone jack.

It is therefore a further object of the present invention to provide a telephone modular jack in which the cover serves to securely hold the contact block in position and further to make the press-fitting between the spring contacts and the terminal units simultaneously with the assembly of the cover onto the base.

Additionally included in the cover is a shutter which is slidable between a closed position of closing the plug cavity and an open position of opening the cavity. The shutter is preferably composed of two plates which can be preassembled from below to the underside of the cover in the form of being overlapped. These plates can be retained in the cover during the assembly with the side edges being supported on rails partially formed on the opposite depending ribs. After assembly, the two plates can be well supported on the top face of the inner frame so that they are allowed to move between the closed and open positions.

It is therefore a further object of the present invention to provide a telephone modular jack in which the shutter for closing and opening the plug cavity can be successfully preassembled to the cover.

These and still other objects and advantages will be apparent from the following description of the embodiment and its modifications of the present invention when taken in conjunction with the attached drawings.

BRIEF DESCRIPTION OF THE DRAWINGS

FIG. 2 is an exploded perspective view of the telephone jack;

FIG. 8 is an enlarged and exploded perspective view of the portion of the telephone jack illustrating the internal electrical connection between one of lead tabs and one of terminal units;

FIG. 9 is an explanatory view illustrating the manner of press-fitting the lead tab to the terminal unit;

FIG. 10 is an explanatory view similar to FIG. 9 but shows a first modified form of the above embodiment;

FIG. 11 is an explanatory view illustrating the latching engagement between separately molded members employed;

DETAILED DESCRIPTION OF THE EMBODIMENT

Figure 1:
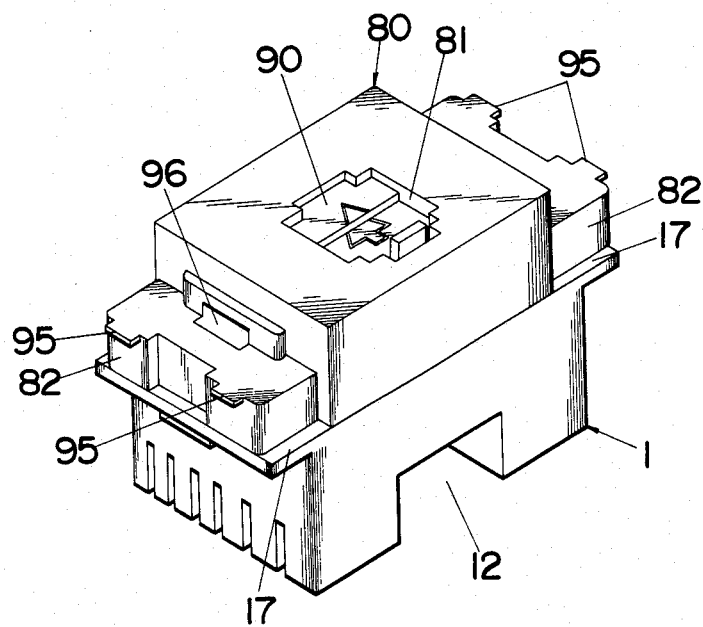
FIG. 1 is a perspective view of a telephone modular jack in accordance with a first preferred embodiment of the present invention.
Figure 4:
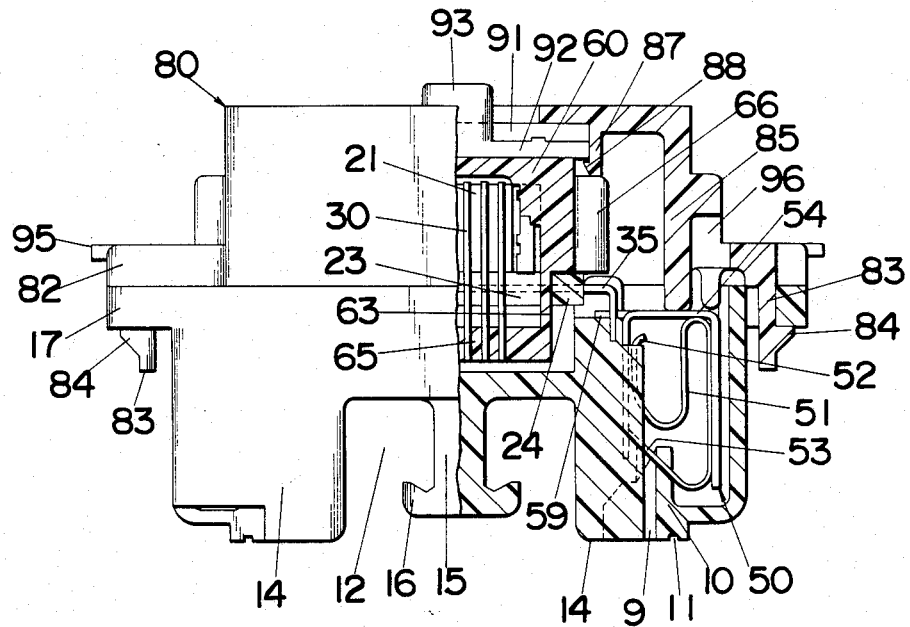
FIG. 4 is a side view, partly in section, of the telephone jack.
Figure 6:
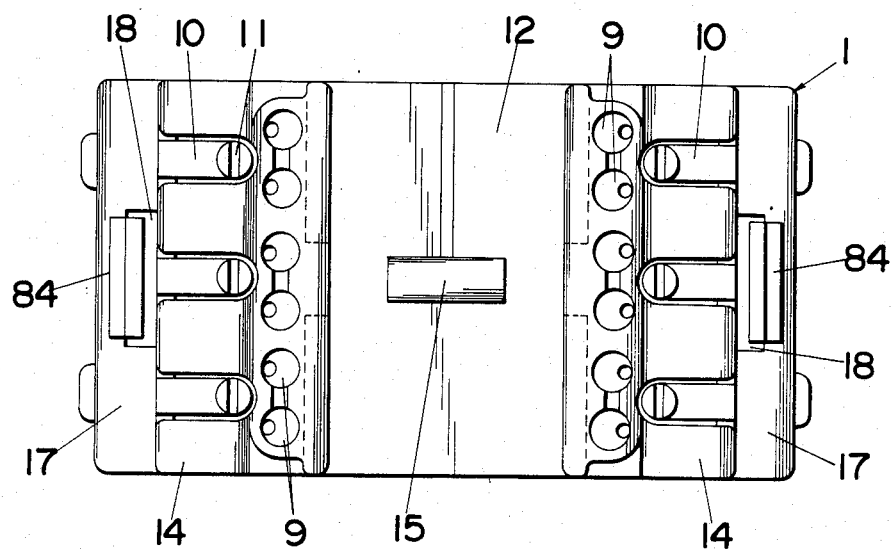
FIG. 6 is a bottom view of the telephone jack.
Figure 22:
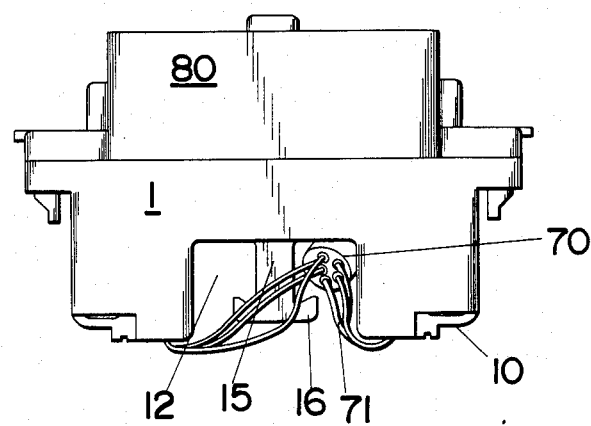
FIGS. 22 and 23 are side and bottom views illustrating the telephone jack together with telephone wiring connected thereto in accordance with the above embodiment.
Figure 23:
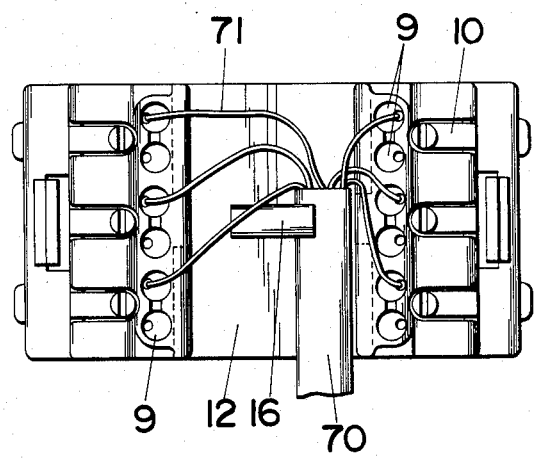

Referring now to FIG. 1, a telephone modular jack of the present invention is adapted in use to be mounted in a wall outlet as attached to a mounting bracket (not shown). The telephone jack comprises a housing mounting therein a contact block 20 carrying an array of cantilever spring contacts 30 for engagement with contact members of a mating standard modular plug (not shown). A plurality of terminal units 50 are also mounted within the jack housing for wiring with external telephone wires 71, for example, as shown in FIGS. 22 and 23. As shown in FIG. 2, the jack housing is composed of a base 1 and a cover 80 both molded from a dielectric material into a generally rectangular configuration. The base 1 is in the form of a top-opened case of which interior is divided by integral partition 2 into a contact compartment 7 for the contact block 20 and rows of terminal compartments 8 on the opposite sides of the contact compartment 7. The terminal compartments 8 on each row are further separate from one another to receive therein the individual terminal units 50. Each terminal compartment 8 extends to the bottom of the base 1 to define thereat a pair of wire introduction apertures 9, as best shown in FIGS. 4 and 6, through each of which the separate telephone wire 71 is inserted for connection with the common terminal unit 50.

The base 1 in formed in its lower surface with a center concave 12 defined by a raised bottom 13 and a pair of opposed side branches 14 each accommodating three terminal compartments 8. The raised bottom 13 defines the bottom of the contact compartment 7 from the underside of which integrally projects a prop 15 with a hook 16 at its lower end for holding a cable 70 having a number of the telephone wires 71 to be connected selectively to one or more of the terminal units 50. Integrally extending outwardly from the top of the base 1 are base flanges 17 each having an aperture 18 for secure connection with the cover 80 to be assembled thereon, the details of which will be discussed hereinafter. A rib 19 is formed on the bottom 13 at a position offset from the center toward one end wall 1a of the base 1 so that it serves as an orientation mark to be sensed such as by a suitable optical means for determining the orientation of the base 1 with respect to the other parts assembled thereto, which facilitates the jack to be assembled in an automated line. Each of the terminal units 50 comprises a particularly configured spring element 51 and an inverted U-shape retainer 54 with a pair of parallel members 55 and 56 connected at one end with a web 57. The spring element 51 has its one end twice bent over and bifurcated to form thereat a pair of grip fingers 52 which are pressed against the one member 55 of the retainer 54 so as to firmly grip the wire or wires inserted therebetween through one or both of the introduction apertures 9 in the bottom of the base 1. The other end of the spring element 51 is likewise bifurcated and bent to form thereat a pair of bite fingers 53 of which edges are urged against the same member 55 of the retainer 54 so as to bite into the wires once inserted for preventing the accidental removal of the wires, while allowing the wires to be readily inserted past the bite fingers 53 to the grip fingers 52. As best shown in FIGS. 4 and 6, the bite fingers 53 of each terminal unit 50 are related to a release knob 10 which is struck from and is formed integrally with the base 1 to be resiliently deformable. When it is required to disengage the wire trapped in the terminal unit 50, the release knob 10 is pressed inwardly to resiliently move the bite fingers 53 away from the member 55, thus releasing the wire and allowing it to be easily removed from the terminal unit 50. The release knob 10 has in its bottom with a slot 11 for receiving a tip, for example, of a screwdriver which may be employed to push the release knob 10. A slot bifurcating the one end of the spring element 51 extends to the middle at which it is engaged with a spur 58 on the other member 56 of the retainer 54. The retainer 54 has an integral lug 59 which projects horizontally from the web 57 beyond the one member 55 for direct connection with each one of the spring contacts 30 on the contact block 20. The lug 59 of each terminal unit 50 is put in each of grooves 3 formed in the top of the partitions 2. Also formed in the top of the partitions 2 are notches 4 each crossing with each groove 3, as best shown in FIG. 8, for effecting the direct connection between the terminal lug 59 and a portion of the corresponding spring contact 30, the detail of which will be described later.

Figure 5:
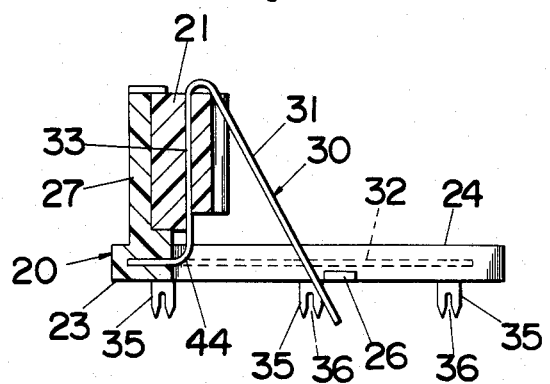
FIG. 5 is a sectional view of a contact block employed in the telephone jack.
Figure 3:
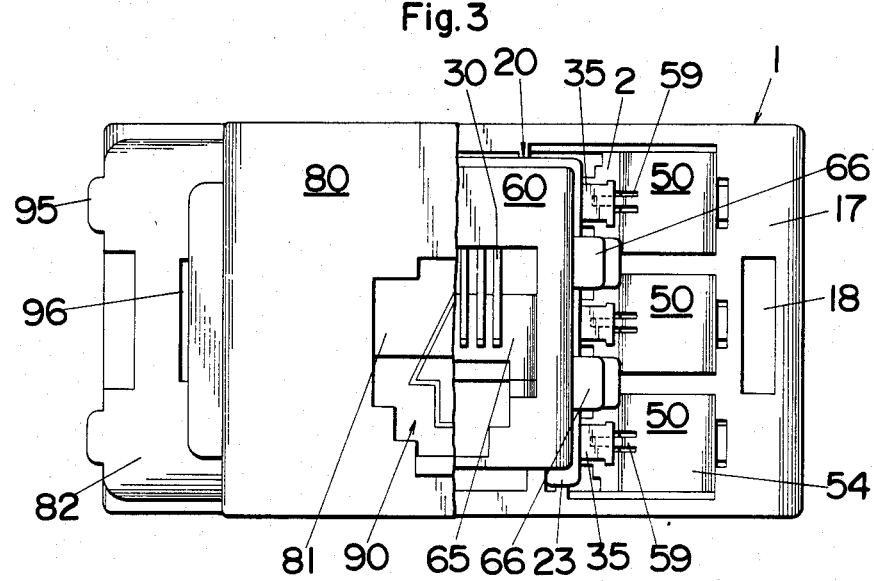
FIG. 3 is a top view, partly being broken away, of the telephone jack.

The contact block 20 is in the form of a unitary structure including an upright support 21 from the top of which the spring contacts 30 projects diagonally downwardly in cantilever fashion to present an array of cantilever spring contacts 30, and a U-shaped horizontal support 23 carrying on its parallel yokes 24 a plurality of lead tabs 35 corresponding in number to the number of the terminal units 50 for direct connection of the spring contacts 30 with the lugs 59 of the terminal units 50. The U-shaped horizontal support 23 is formed on its web 25 with an upright wall 27 for holding the upright support 21 in position. As best shown in FIG. 5, each of the spring contacts 30, which are stamped and formed from a metal carrier 40 as partially molded in the upright support 21 and the horizontal support 23, comprises a first end portion 31 defining the array of the cantilever spring contacts 30, a middle portion 33 imbedded in the upright support 21, and a second end portion 32 imbedded in the horizontal support 23 to extend therethrough from the web 25 into the corresponding yoke 24, these portions being bent relative to each other.

It is from this second end portion 32 that each of the lead tabs 35 extends out of the yokes 24 of the horizontal support 23. Each of the lead tabs 35, which are evenly spaced along the yokes 24, is bent at a right angle to the second end portion 32 and is further bifurcated at its end to form therein a slit 36 into which the corresponding terminal lug 59 is forced for press-fit engagement therewith. When the contact block 20 is mounted in the contact compartment 7 of the base 1 with the parallel yokes 24 of the horizontal support 23 positioned adjacent insides of the partitions 2 and with the web 25 between the end wall 1a and the positioning rib 19, each of the lead tabs 35 is inserted into the corresponding notch 4 in the partition 2 where it meets the terminal lug 59 already seated in the groove 3 in crossing communication with the notch 4. Accordingly, the terminal lugs 59 are forced into the slit 36 of the corresponding lead tabs 35 as the lead tabs 35 are inserted in the notches 4 so that they are interconnected in press-fitted fashion simultaneously with the mounting of the contact block 20 to the base 1, completing the direct connection between the spring contacts 30 and the terminal units 50. As shown in FIG. 9, the bifurcated end of the lead tab 35 is tapered so as to be compressed inwardly as it is inserted into the notch 4, providing firm grip between the lead tab 35 and the terminal lug 59 within the slot 37. The lead tab 35 may receive the compressive force from the upper edges 5 of the notch 4 as shown in FIG. 9 or from the inclined lower edges 6 projected in the notch 4 as shown in a modified form of FIG. 10.

Figure 12:
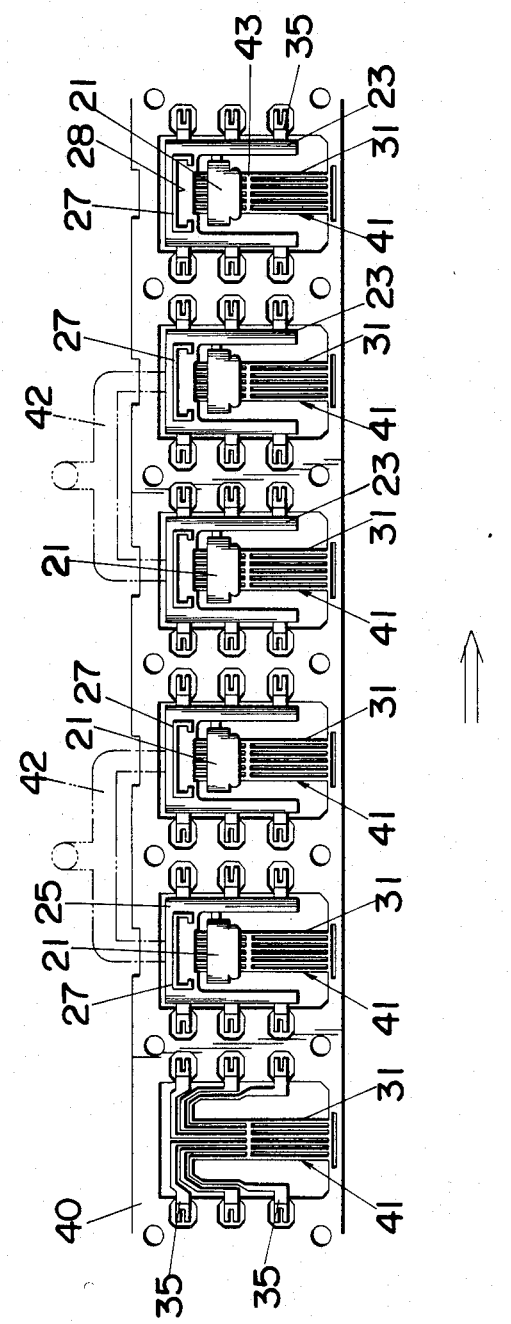
FIGS. 12 to 14 are explanatory views illustrating the process of forming spring contacts from a metal strip imbedded partial in mold parts, the steps of the process advancing from FIG. 12 to FIG. 14 in each of which the steps follows in directions as indicated by arrows.
Figure 13:
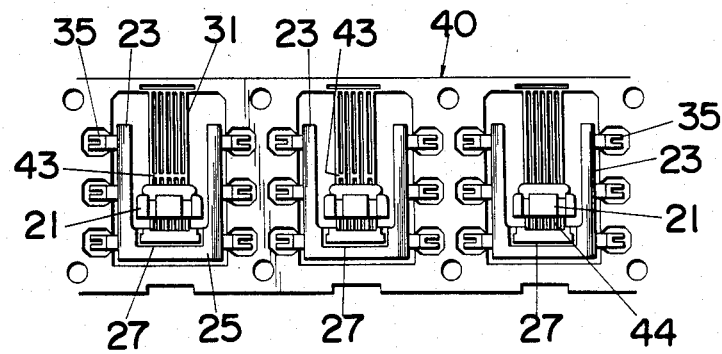
Figure 14:
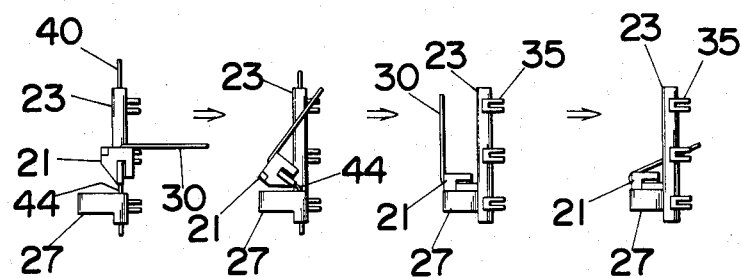

FIGS. 12 to 14 show a process of forming the contact block 20. Referring firstly to FIG. 12, a number of contact modules 41 forming the spring contacts 30 are stamped from the metal carrier or tap 40 and retained thereby. The metal carrier 40 is fed along its length through a molding device (not seen) where a molding material is supplied through a runner 42 over two separate portions of each contact module 41 to form thereon the upright support 21 and the horizontal support 23 with the upright wall 27. At this step, the upright support 21 lies in the plane of the horizontal support 23. After the molding in of the contact module 41, the spring contacts 30 in each contact modules 41 are separated from each other at segments 43 in a manner as shown in FIG. 13. The segments 43 are provided adjacent the upright support 21 to unite the individual spring contacts 30 together (seen in left module of FIG. 13) for preventing them from breaking up in the previous molding stage. The segments 43 are firstly removed by pouching at portions uniting the 2nd and 3rd, and the 4th and 5th spring contacts 30 (seen in the middle module of FIG. 13), and subsequently removed at portions uniting the 1st and 2nd, the 3rd and 4th, and the 5th and 6th spring contacts 30 (seen in the right module of FIG. 13). With this technique, the compressive stresses acting on the individual spring contacts 30 developed at the punching can be compensated, preventing the spring contacts 30 from deforming unduly. Each of the contact modules 41 are then separated from the carrier strip 40 at the free ends of the spring contacts 30 and at the lead tabs 35. The lead tabs 35 are bent downward simultaneously with the separation thereof from the metal carrier 40. Subsequently, as shown in FIG. 14, the contact module 41 is subjected to a bending process in which the upright support 21 is firstly raised toward the upright wall 27 by bending the spring contacts 30 at portions 44 between the upright support 21 and the upright wall 27 and is firmly secured to the upright wall 27 with lateral projections 22 of the upright support 21 snapped in corresponding catch recess 28 in the upright wall 27 (seen in FIG. 2). Finally, the spring contacts 30 projecting from the upright support 21 are bent over the rounded top edge thereof to extend diagonally beyond the plane of the horizontal support 23, thus forming the contact block 20.

In the assembled position of the contact block 20, the upright support 21 has its lower end placed upon the positioning rib 19 so that the spring contacts 30 are held in a predetermined vertical position relative to the base 1. An inner frame 60 to be assembled onto the contact block 20 is shaped from a dielectric material to have a plug receiving cavity 61 which is in registration with a window 81 in the subsequently assembled cover 80 for receiving in the mating modular plug (not seen) therethrough. Formed in the inner frame 60 adjacent to the cavity 61 is a bottom-opened hole 62 into which the top portion of the contact block 20 received. A pair of integral extension 63 depend from the inner edges of the opposite sides of the inner frame 60 to extend between the opposed yokes 24 of the horizontal support 23 of the contact block 20 for engagement therewith. To this end, each of the extensions 63 has on its exterior face a latch projection 64 which is latched into an undercut 26 formed in each of the yokes 24 of the horizontal support 23. This latching engagement is effected simply by assembling the inner frame 60 down over the contact block 20 during which the yokes 24 are resiliently deformed outwardly to allow the latch projections 64 to extend past the yokes 24 and after which they are resiliently restored to effect the latching engagement, as shown in FIG. 11. Bridging between the lower ends of the opposed extensions 63 is a comb 65 which receives the free ends of the spring contacts 30 in a predetermined spaced relation. When assembled to the contact block 20, the inner frame 60 rests on the horizontal support 23 to press it downward into an exact vertical position, as best shown in FIG. 4. Also formed on the opposite sides of the inner frame 60 are pokes 66 which receive thereon respectively depending ribs 87 of the cover 80.

Figure 15:
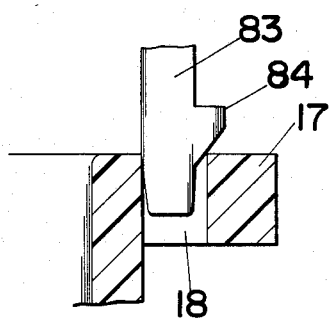
FIG. 15 is an enlarged partial view of the telephone jack to illustrate the latching connection between a jack base and a jack cover.
Figure 16:
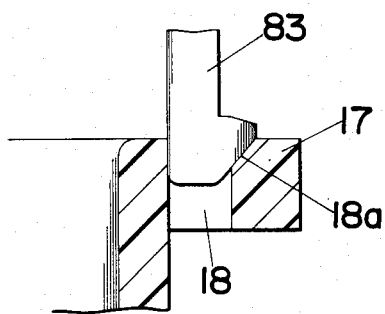
FIG. 16 is an enlarged partial view similar to FIG. 15 but shows a second modified form of the above embodiment.

Integrally formed with the cover 80 are a pair of cover flanges 82 which extends outwardly from the lower ends of the opposite sides thereof, each cover flange 82 having an integrally depending resilient leg 83 with a barb 84 for snap engagement with the base flange 17. The cover 80 is assembled over the inner frame 60 and the contact block 20 onto the base 1 with each resilient leg 83 extending through the aperture 18 in the cover flange 25 and secured to the base 1 with the barb 84 on each leg 83 snapped into the aperture 18. This assembly can be made simply by placing the cover 80 with the lower end of each resilient leg 83 inserted into the corresponding aperture 18, as shown in FIG. 15 and then pressing the cover 80 down against the base 1, whereby the barb 84 on each leg 83 is forced to pass through the aperture 18 so as to be snap engaged with the lower edge of the aperture 18. In the embodiment shown in FIG. 15, the barb 84 is formed slightly upwardly of the extreme lower end of the resilient leg 84 so that the portion below the barb 84 is inserted in the corresponding aperture 18 for retaining the cover 80 on the base 1 until it is finally pressed downwardly for complete assembly. Alternatively, when the barb 84 is formed at the lower end of the resilient leg 83 as shown in FIG. 16, the aperture 18 may be formed with a countersink 18a for receiving therein the lower end of barb 84 for retaining the cover 80 in position on the base 1 until the cover 80 is finally pressed down to be secured to the base 1.

Figure 7:
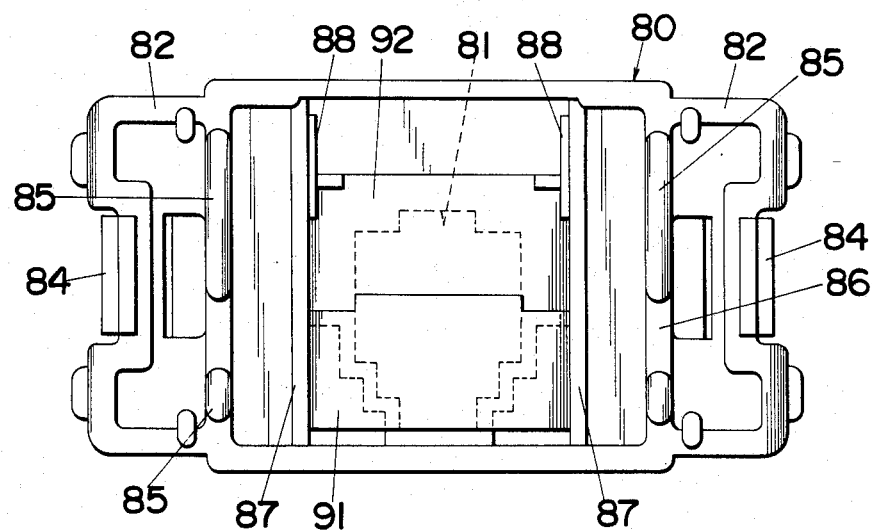
FIG. 7 is a bottom view of a cover of the telephone jack.

Inwardly of each resilient legs 83 there is formed a bump projections 85 which depends integrally from the cover 80 for pressing down the terminal units 50 into positions when the cover 80 is assembled on the base 1, as best shown in FIG. 4. The bump projections 85 are preferably split at 86 offset from the center of its length, as shown in FIG. 7, so that the cover 80 can have a directional orientation for preventing misregistration of the cover 80 with the base 1 in an automated assembly line. It should be noted at this point that, when the cover 80 is assembled to the base 1, the ribs 87 depending from the opposite sides of the window 81 will press against the pokes 66 on the inner frame 60 which in turn press the horizontal support 23 of the contact block 20, for effecting the press-fit engagement between the lead tabs 35 and the corresponding terminal units 50.

Included in the cover 80 is a shutter 90 movable between a closed position of closing the window 81 and an open position of opening the same. The shutter 90 is composed of two slidable plates 91 and 92, one being capable of overlying on the other in a slidable relation therewith. The plates 91 and 92 have respective indented markings which are cooperative to represent an arrow mark when the plates 91 and 92 are extended to close the window 81, indicating the opening direction of the shutter 90. The shutter 90 is preassembled into the cover 80 from the underside thereof in the form of the one plate 91 being overlapped on the other plate 92 and is retained therein with the side edges of the lower plates 92 rested upon rails 88 formed respectively on the depending ribs 87. As best shown in FIG. 7, the rails 88 are partially formed along the length of the ribs 87 to extend only at the portion away from the window 81 so that the overlapped plates 91 and 92 can be preassembled into the cover 80 by being introduced between the ribs 87 without the rails 88 an then being traversed along the ribs 87 until the side edges of the lower plates 92 rest on the rails 88, which is the closed position. After the cover 80 is assembled on the base 1, the top face of the inner frame 60 serves to support the plates 91 and 92, allowing them to move between the closed and open positions.

Figure 17:
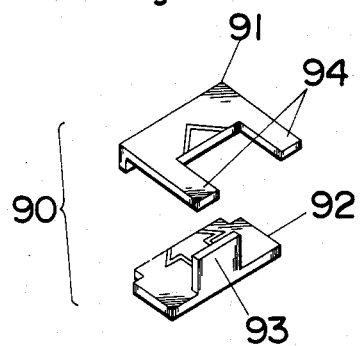
FIG. 17 is a perspective view of an alternative shutter structure to be preassembled to the jack cover.

It is noted at this time that the telephone modular jack of the present invention is generally installed in the wall outlet with the arrow head of the marking on the shutter 90 oriented upwardly so that the plates 91 and 92 are biased under the effect of the gravity into the closed position. Opening of the window 81 is made by pulling a knob 93 projecting from the lower plate 92 outwardly of the window 81. FIG. 17 shows a modified shutter 90 in which the upper plate 91 has a pair of legs 94 to be placed over the lower plate 92 when assembled to the cover 80. With the provision of the legs 94, the lower plate 92 is inhibited to be firstly assembled to the cover 80 from below and can be only allowed to be assembled after the upper plate 91 is assembled to the cover 80, ensuring proper procedure for the shutter 90.

The cover 80 is also provided at the ends of the cover flanges 82 respectively with sets of fingers 95 and at the portions inwardly thereof with ditches 96 which are utilized to secure the telephone jack to the complimentary mounting bracket (not seen) fixed to the wall outlet.

As described in the above, the terminal units 50, contact block 20, inner frame 60, and cover 80 can be assembled onto the base 1 simply by being placed and pressed downwardly on the base 1, which enabling the telephone jack of this construction to be readily assembled in an automated line.

Figure 18:
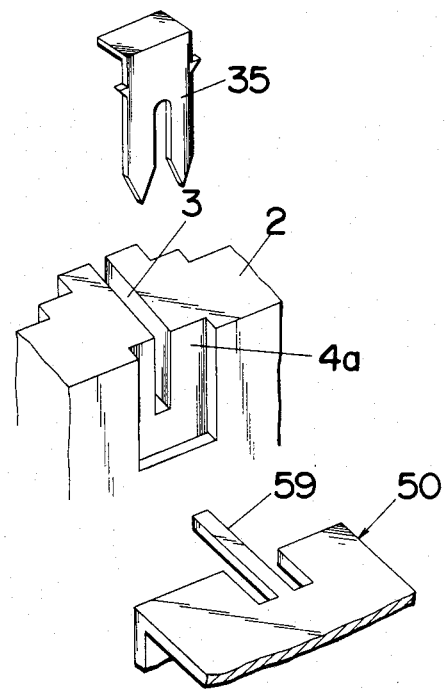
FIG. 18 is an enlarged and exploded perspective view similar to FIG. 8 but shows a third modified form of the above embodiment.
Figure 19:
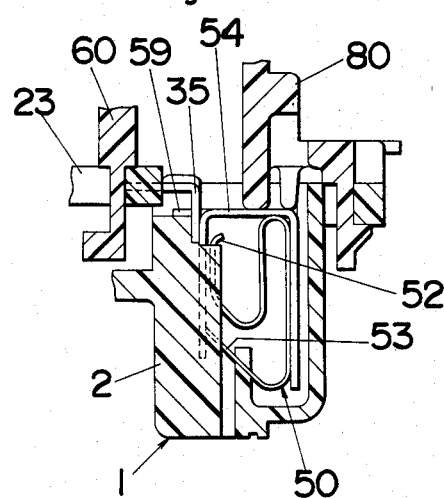
FIG. 19 is a partial sectional view of the third modification of FIG. 18.

Although the notches 4 for receiving the lead tabs 35 are formed within the thickness of the partitions 2 in the embodiment of FIG. 8, the notch 4a may be formed in the surface of the partition 2 exposed to the terminal compartments 8, as shown in FIG. 18. In this modification with the exposed notches 4a, each of the lead tabs 35 can be engaged also with the one member 55 of the corresponding terminal unit 50 in addition to the press-fit engagement with the lug 59, as shown in FIG. 19, for providing an increased contact area with the terminal unit 50.

Figure 20:
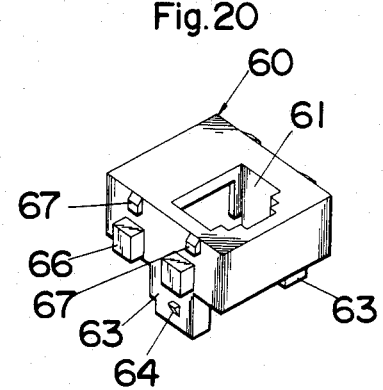
FIG. 20 is a perspective view of an inner frame employed in a fourth modification of the above embodiment.
Figure 21:
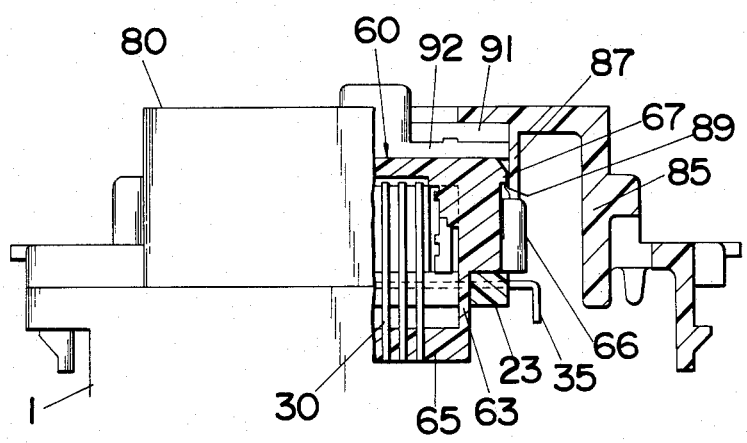
FIG. 21 is a partial sectional view of the fourth modification of FIG. 20.

In another modification of FIGS. 20 and 21, the inner frame 60 is provided on the opposite sides with latches 67 at portions upwardly of the pokes 66. The latches 67 will come into engagement with corresponding barbs 89 at the lower end of the depending ribs 87 when the cover 80 is assembled to the base 1, establishing the connection between the cover 80 and the inner frame 60.

FIGS. 22 and 23 show one useful wiring connection to the telephone modular jack of the present invention in which the prop 15 extending from the raised bottom 13 of the base 1 is utilized to hang on its hook 16 the cable 70 having a plurality of telephone wires 71 connected to the selected terminal units 50.

Figure 24:
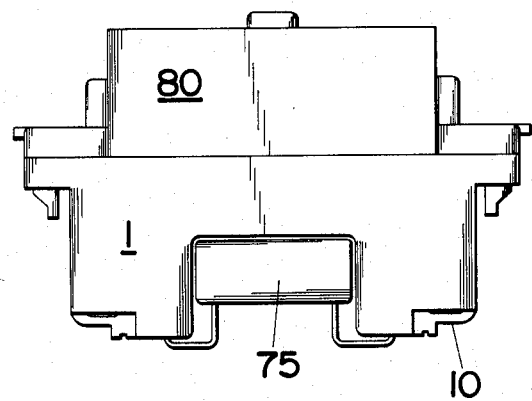
FIGS. 24 and 25 are side and bottom views illustrating the telephone jack together with a capacitor connected thereto in accordance with above embodiment.
Figure 25:
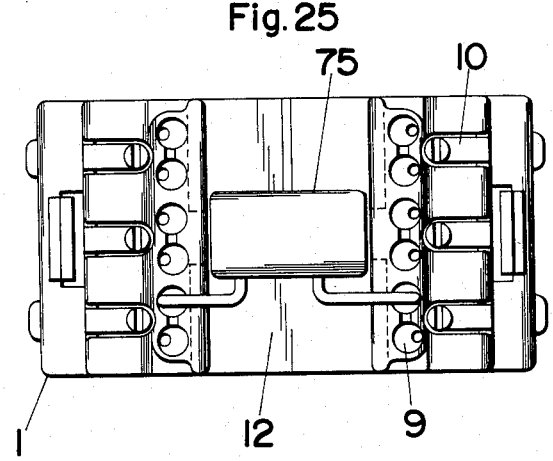

FIGS. 24 and 25 show another usage of the telephone modular jack in which a capacitor 75 connected across a pair of selected terminal units 50 are received in the concave 12 in the bottom of the base 1 from which the prop 15 has been removed.

Figure 26:
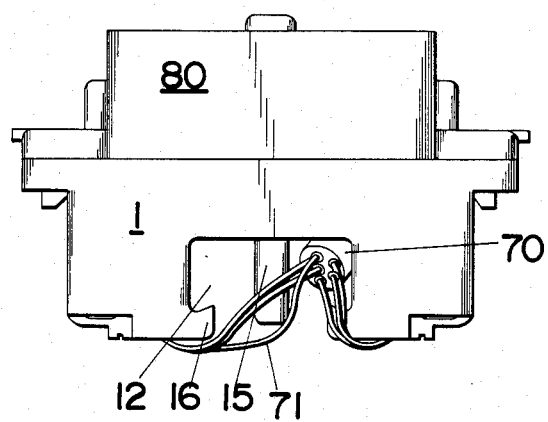
FIGS. 26 and 27 are side and bottom views illustrating the telephone jack together with bundled telephone wiring connected thereto in accordance with a fifth modification of the above embodiment.
Figure 27:
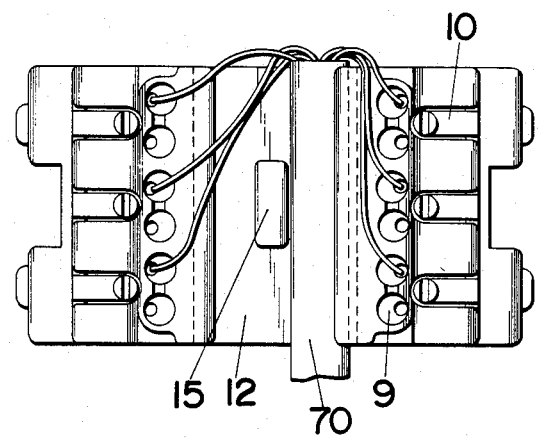

FIGS. 26 and 27 show a modified structure of the base 1 in which hooks 16 are provided on the inner bottom of the opposed side branches 14 instead of being formed on the prop 15. In this modification, the cable 70 can be likewise held in the concave 12 by being supported on either of the hooks 16.

Figure 28:
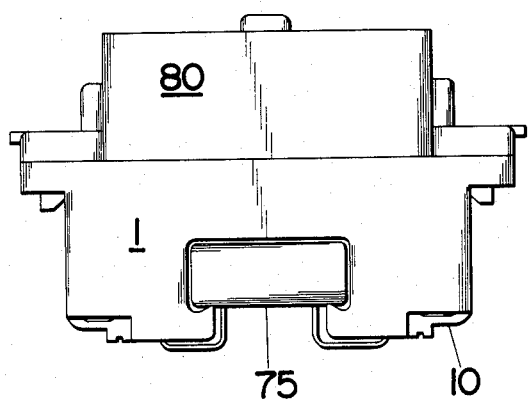
FIG. 28 and 29 are side and bottom views illustrating the telephone jack together with a capacitor connected thereto in accordance with the fifth modification.
Figure 29:
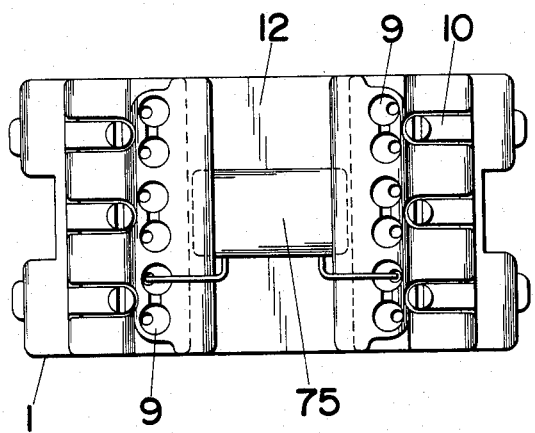

FIGS. 28 and 29 show the connection of the capacitor 75 to the telephone jack having the above modified structure. In this instance, the capacitor 75 is held within the concave 12 with its ends supported on the hooks 16 on the opposite side branches 14 from which the prop 15 has been removed.

What is claimed is:

1. A telephone modular jack comprising:
   a housing having a plug cavity for receiving a mating modular plug with an array of contact members, said housing comprising a top-opened base of dielectric material and a cover of dielectric material which is assembled on the top of said base and has a profiled window for allowing the entry of said modular plug into the plug cavity;
   a contact block mounted in the housing and carrying an array of spring contacts for electrical engagement respectively with the contact members of the modular plug, said spring contacts being stamped and formed from a metal strip;
   a plurality of terminal units mounted in the housing each for wiring with a telephone wire, each of said terminal units having a lug for direct electrical connection with each of the spring contacts to provide electrical continuity from the respective spring contacts to the telephone wires through the corresponding terminal units;

said base being formed with a top-opened contact compartment& for mounting therein said contact block and with a plurality of top-opened terminal compartments adjacent to said contact compartment for mounting therein said terminal units, said terminal compartment being separated from said contact compartments by upstanding partition means, said partition means being formed in its top surface with grooves into which said lugs of the terminal units are inserted, respectively;

said spring contacts each having along its length a first end portion, a middle portion, and a second end portion opposite of said first end portion, said portions being bent from the adjacent portions;

said contact block including an upright support in which the middle portions of said spring contacts are imbedded in such a manner that the first end portions of said spring contacts project from the top end of the upright support diagonally down to the bottom of said contact compartment in cantilever fashion within said plug cavity, said contact block further including a horizontal support in which the second end portions of said spring contacts are imbedded;

said second end portion of each spring contact having an integral lead tab projecting outwardly of the horizontal support, said lead tab being inserted in each of notches formed in the top surface of said partition means and crossed with said grooves such that said lug of each terminal unit retained in the groove can be engaged with the corresponding lead tab when the contact block is assembled down onto the base;

one of the lug of the terminal unit and the lead tab of the spring contact being formed therein with a slit for receiving the portion of the other in order to effect press-fit engagement therebetween upon the mounting of the contact block on the base; and said cover having means for latching engagement with said base when the cover is assembled onto the base.

2. A telephone modular jack as set forth in claim 1, wherein said slit is formed in each of the lead tabs for receiving the lug of each terminal unit.

3. A telephone modular jack as set forth in claim 1, wherein said terminal compartments extend to the bottom of the base to form thereat wire introduction apertures through which the wires are inserted for wiring with the selected terminal units.

4. A telephone modular jack as set forth in claim 1, wherein said terminal compartments are arranged on both sides of said contact compartment and wherein said horizontal support is of U-shaped configuration with a pair of parallel yokes which are bridged by a web and from each of which said lead tabs project for direct electrical connection with said lugs of the corresponding terminal units.

5. A telephone modular jack as set forth in claim 4, wherein said web of the horizontal support is molded with an upright wall which is separated from said upright support but connected thereto through said spring contacts at the segments between said middle portions and said second end portions, said upright wall having a catch recess into which said upright support is securely received with the spring contacts bent at said segments.

6. A telephone modular jack as set forth in claim 4, further including an inner frame of dielectric material which is formed separately from said contact block and is placed on the contact block under said cover, said inner frame having a profiled hole which is in register with the window in said cover to define therein said plug cavity, said inner frame further provided at its lower end with an integral comb which holds the free ends of said spring contacts in such a manner as to electrically separate them from one another, said comb bridging between a pair of downward extensions from the side walls of inner frame, said inner frame being assembled to the contact block with its bottom seated on said horizontal support and secured thereto with latches on the downward extensions engaged with undercuts formed in the parallel yokes of said horizontal support.

7. A telephone modular jack as set forth in claim 6, wherein said cover is formed on its undersurface with a pair of depending ribs which are forcibly abuts against poke projections on the opposite sides of said inner frame to thereby press the inner frame along with said contact block upon the base for holding them in a fixed position between the base and the cover.

8. A telephone modular jack as set forth in claim 6, wherein said base is formed on its opposite sides with outwardly extending base flanges each having an aperture therein, said cover being formed on its opposite sides with outwardly extending cover flanges from each of which a resilient leg with a barb depends integrally so that, when assembling said cover on the base with the cover flanges placed on the base flanges, the resilient legs are resiliently deformed to permit the barbs to pass through the apertures into locked engagement with the lower edges of the apertures.

9. A telephone modular jack as set forth in claim 6, further including a shutter for closing and opening the window of said cover, said cover being formed on the underside thereof with a pair of ribs depending respectively from the opposite side edges of the window and extending horizontally along the opposite sides of the window, said ribs being formed on the opposed surfaces with rails on which the side edges of said shutter are slidably supported.

10. A telephone modular jack as set forth in claim 9, wherein said shutter is composed of two plates which are slidable with each other in overlapping fashion and movable together between a close position in which they are fully extended to close said window of the cover and an open position in which they are overlapped to open said window, and wherein said rails are partially formed along the length of the ribs such that the plates can be supported by the rails only in the closed position while they can be supported on the top face of said inner frame in the open position.

* * * * *